2,816,032

METHOD OF PREPARING A HOPS POWDER

Willy Heyer, Munich, Germany

No Drawing. Application August 30, 1954,
Serial No. 453,141

Claims priority, application Germany August 31, 1953

10 Claims. (Cl. 99—50.5)

The present invention relates to a method of preparing a hops powder by extracting natural or fresh hops with the aid of an alkaline solvent. A hops powder prepared by the method according to the invention has an application as a base material in the making of beer.

According to the invention, the hops is extracted in a brewing wort of 4 to 6 percent and softened brewing water, the hydrogen ion concentration (pH number) being adjusted from 8.0 to 8.3. With the pH number maintained within this range, an optimum yield of iso-humulon is obtained, which substance is of prime importance in regard to the making of beer, said substance being obtained as a transformation product of humulon which latter is soluble in wort and beer to a very slight extent only.

According to a specific object of the invention the desired pH number of between 8.0 and 8.3 is adjusted by the addition of alkaline salts. Substances particularly suitable for this purpose are soda lye, soda, potash and in the case of boiling under pressure, salt of ammonium.

One major object of the invention is to be seen in the fact that the pH number, once it has been adjusted to a value between 8.0 and 8.3, is stabilized by a buffer substance contained in the wort. A suitable buffer substance, is for example a solvent of potassium-sodium phosphate. A buffer substance of this type may be relied upon to maintain substantially constant the pH number which may take any value between 8.0 and 8.3, the use of the buffer substance preventing the pH number from exceeding its upper limiting value, thus preventing any undesirable formation of humulinic acid.

The adjustment of the pH number between 8.0 and 8.3 may be performed, according to the invention, by titrimetric or electrometric methods.

As regards any of the embodiments of the method according to the invention, it is necessary, also according to the invention, to remove to the greatest possible extent, prior to any other treatment, any tanning substances that may be contained in the hops to be extracted, so as to preserve the albumen substances contained in the wort, it having been found that said albumen substances provide a protective colloid action tending to promote the transformation of humulon into isohumulon during the boiling process.

These and other features will become apparent from the following description of the invention, it being intended, by way of describing in detail a preferred embodiment, to explain said features and the advantages afforded thereby.

A quantity of 100 kilograms of fresh hops having an overall resin content of, say, 16.0 percent (air-dry) at a humulon content of 5.0 percent (air-dry) is disintegrated as conservatively as possible and then transferred into a vessel provided with heating means and an agitator, the drain of said vessel being provided at the inner wall thereof with a removable filter element. Then, in order to remove the tanning substances, the disintegrated hops is treated by pouring over it a quantity of between 1500 and 2000 liters of cold, softened brewing water and then left standing for about thirty minutes without any agitation. Then, in order to prevent any loss of lupulin, the water containing the tanning substances thus removed is drained by way of the said filter element. After the hops has been drained, again between 1500 and 2000 liters of cold brewing water is poured onto the hops, the treatment of the hops being repeated in the manner just indicated. The washing water drained from the vessel is collected and then subjected to further treatment for the purpose of obtaining the tanning substance.

Now the moist hops, which contains little tanning substance is mixed with 350 liters of an approximately 6% brewing wort and a mixture prepared of 900 liters of softened hot water and approximately 3 liters of 35% soda lye. With an extract content of the beer wort of about 6 percent and a proportion of approximately 80% of carbohydrates, the quantity of soda lye provided for is sufficient, in view of a total resin content of the hops of approximately 16 percent, to obtain an approximate ratio of 1:1 between bitter substances and carbohydrates, which ratio is favorable as regards the fixation of aroma substances and the protection against oxidation.

While being constantly agitated, the material is now brought to a boil, whereafter the solution is given the desired pH number of between 8.0 and 8.3 by adding dilute soda lye. Under no circumstances must the upper limit given be exceeded, as undesirable side effects would otherwise result. Upon the pH number of the solution having been established within the range indicated, there is finally added to the solution approximately 120 liters of a buffer solution containing 1.4 kilograms of $$Na_2HPO_4 \cdot 2H_2O$$

and 33.8 grams of $KH_2PO_4$, this solution serving to fix the pH value. It is recommended to use distilled water in preparing the buffer solution. After boiling and agitating the hops solution for approximately two hours, the desired maximum transformation of humulon into iso-humulon will have been completed.

The adjustment of the pH number within a certain range as called for by the invention is of decisive importance as regards the transformation reaction above referred to, because, if the pH number given is allowed to exceed its limiting value in respect to the alkaline range, the isohumulon, which, in contrast to humulon is completely soluble in the beer and is thus responsible for the bitter taste of the beer, will undergo a reaction which, while being attended by the separation of the carbonyl group in the side chain, will produce the undesirable humulinic acid. On the other hand, with the pH number being changed towards the acid range, the formation of isohumulon will decrease progressively. In any event it will be necessary to provide alkali in excess of the amount required to neutralize the humulon, as the desired transformation reaction would otherwise fail to occur. In special cases, i. e. when it is found during the boiling process that the pH number is shifted slightly towards the acid range, it will be necessary, by adding further amounts of dilute soda lye to restore the pH number to its original value. In such cases use should be made of an automatic pH meter with glass electrode, this being indispensable in cases in which, according to another feature of the invention, the boiling process is performed under a pressure of approximately 0.3 kilogram per square centimeter (4.25 pounds per square inch), the length of the boiling period then being reduced to approximately 45 minutes.

Upon completion of the boiling process the solution, while still hot, is filtered or centrifuged, the hops draff being briefly washed with warm water or a mixture of alcohol and water, and the combined clear filtrates are reduced in a vacuum evaporator to approximately one-half their original volume, whereupon the filtrates are dehydrated in a spraying plant using a temperature of 80 deg. cent. (176° Fahrenheit) or, where desired, in a suitable vacuum, in which latter case a temperature of 30 deg. cent. (86° Fahrenheit) is used.

The hops powder thus obtained, given proper storage, will keep for years and spectrophotometric tests have shown that it contains approximately 10 percent isohumulon. However, this percentage depends on the humulon content of the natural hops used in the process. The transformation of the humulon into isohumulon during the process of the invention is nearly of a quantitative nature.

The said powder is characterized by the fact that it will easily dissolve in warm water or in beer wort, the powder thus being distinguished from pulverized dehydrated hops extracts obtained by processes using organic solvents. The latter type powders contain the hops waxes which are also extracted by the said organic solvents; the said waxes may well facilitate the spraying process, but they impair the solubility of the powder in the wort to be hopped. Moreover, spectrophotometric tests have shown that hops powders of the last-mentioned types, in similarity to hops concentrates in syrup form, contain only negligible amounts of isohumulon, while bitter resins preponderate, which resins are insoluble in beer. Any further transformation of the bitter resins will occur only after prolonged boiling, it being possible, however, to a small extent only to transform them at the brewery into the beer-soluble isohumulon which exclusively determines the noble bitterness of the beer, this being so because the pH number of the wort used in the brewery fails to promote this transformation. The bitter taste produced under certain circumstances by the easily water-soluble tannin is of a rough nature and is in most cases undesirable.

The dehydrated hops powder obtained by the method of the invention contains truly soluble amounts of isohumulon. Quantitative spectrophotometric tests have shown these bitter substances, which are immediately soluble in water or wort, to contain at least 75 percent of isohumulon. It has been known that the bitter value of isohumulon is a multiple of that of the remaining bitter substances yielded by hops, and it is therefore possible, by using the dehydrated hops powder obtained by the method of the invention, to save major amounts of natural hops, commercial tests having shown that savings of up to 50 percent may be achieved. Furthermore, it is possible for the practical man, by using this material, to obtain accurate dosage. Tests have also shown that beer made in accordance with the main feature of the present invention has a bitter taste which is much more sublime. The technique of adding hops may be left at the discretion of the brewer who has to take care of the various nuances of taste.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. The method of preparing a hops powder, comprising the steps of removing tanning substances from fresh hops by at least one infusion of said hops with softened cold brewing water, decanting the water containing the tanning substances thereby to collect moist purified hops, placing the purified hops thus obtained, in a brewing wort of substantially 6 percent solids content by weight and a mixture of softened hot water and soda lye, heating the mixture thus prepared to its boiling point, adjusting the pH number of the said mixture to a value between 8.0 and 8.3 by the addition of dilute sodium lye thereto, fixing the desired pH number by the addition of a buffer solution containing disodiumhydrogen phosphate ($Na_2HPO_4.2H_2O$) and potassiumdihydrogen phosphate ($KH_2PO_4$), boiling and constantly agitating the solution thus obtained for approximately two hours, separating the resultant hot solution into a clear filtrate and hops draff, and dehydrating the said filtrate in a vacuum evaporator at a temperature of approximately 30 deg. cent. (86° F.) thereby to obtain a hops powder.

2. The method of claim 1 wherein said hops draff is after-rinsed during said separating step, the product of said after-rinse being collected as a portion of said filtrate.

3. The method of claim 1 wherein said separating step comprises filtering said hot solution.

4. The method of claim 1 wherein said separating step comprises centrifuging said hot solution.

5. A method of preparing a hops powder, comprising the steps of soaking natural hops at room temperature for a period of approximately 30 minutes in softened cold brewing water thereby to remove tanning substances from said hops, separating said brewing wort from the resultant purified hops, thereafter extracting the said purified hops in a 4 to 6 percent by weight brewing wort and adjusting the pH number (hydrogen ion concentration) of said wort during said extraction to a value between 8.0 and 8.3 by the addition of potassium carbonate thereto.

6. A method of preparing a hops powder, comprising the steps of freeing natural hops of tanning substances by soaking the said hops at room temperature for a period of approximately 30 minutes in softened cold brewing water, thereafter extracting the said hops in a 4 to 6 percent by weight brewing wort, and adjusting the pH number of said mixture during extraction to a value between 8.0 and 8.3 by the addition of an ammonium salt thereto, said extraction step including boiling the mixture of hops, wort, and salt for approximately 45 minutes under a pressure of approximately 4.25 pounds per square inch gauge.

7. The method claimed in claim 5, wherein the said pH number of said mixture, after the said adjustment to a value between 8.0 and 8.3, is stabilized during said extraction by the addition of a buffer solution thereto containing approximately 1.4 kilograms of $$Na_2HPO_4.2H_2O$$

and 33.8 grams of $KH_2PO_4$ in 120 liters of the said solution.

8. The method claimed in claim 5, wherein wet hops, obtained after freeing 220 lbs. (100 kgs.) of fresh hops from the said tanning substances, is added to 92½ gallons (350 liters) of an approximately 6 percent by weight brewing wort having an extract content of approximately 80 percent of carbohydrates referred to the solids content, adding to said hops and wort a mixture of 238 gallons (900 liters) of softened hot water and approximately .79 gallon (3 liters) of 35 percent by weight soda lye, the pH number of said composite mixture being adjusted to said value of between 8.0 and 8.3 by the addition to said mixture of the aforementioned approximately .79 gallon (3 liters) of dilute soda lye, and stabilizing the pH number of the said mixture by the addition thereto of approximately 31.7 gallons (120 liters) of a phosphate buffer solution whereby, with a total resin content of the hops of approximately 16 percent, the ratio between the bitter substances and the carbohydrates in the final hops powder will be approximately 1:1.

9. A method of preparing a hops powder, comprising the steps of removing tanning substances from fresh hops by infusing the said fresh hops at least once with softened cold brewing water, decanting the water containing the tanning substances thereby to obtain purified hops, adding to the purified hops thus obtained a 6 percent by weight brewing wort having an extract content of approximately 80 percent of carbohydrates referred to the solids content, further adding to said mixture a mixture of softened hot water and soda lye, heating the resultant hops mixture to its boiling point, finally adjusting the mixture to a pH number between 8.0 and 8.3 by the addition of dilute soda lye thereof, fixing the said pH number by adding to said mixture a buffer solution comprising disodium hydrogen phosphate and potassium dihydrogen phosphate, boiling the resultant mixture for approximately two hours while constantly stirring the mixture, separating the resultant hot solution from the hops draff thereby to obtain a first filtrate, after-rinsing the hops draff with warm water and alcohol to obtain a further filtrate, combining said filtrates, and dehydrating the combined filtrates in a vacuum sprayer at a temperature of at least 86° F. thereby to obtain a hops powder.

10. A method of preparing a hops powder, comprising the steps of freeing natural hops of tanning substances in an infusion of softened brewing water at room temperature for a period of approximately 30 minutes, and thereafter extracting the purified hops in a 4 to 6 percent by weight brewing wort the pH number of which is adjusted to a value between 8.0 and 8.3 during said extraction by the addition of soda thereto.

References Cited in the file of this patent

UNITED STATES PATENTS

| | | |
|---|---|---|
| 46,973 | Percy et al. | Mar. 21, 1865 |
| 244,695 | Walker | July 19, 1881 |
| 978,476 | Nilson | Dec. 13, 1910 |
| 1,149,704 | Wahl | Aug. 10, 1915 |
| 2,647,837 | Salac | Aug. 4, 1953 |